(12) United States Patent
Narayanan et al.

(10) Patent No.: US 6,980,401 B1
(45) Date of Patent: Dec. 27, 2005

(54) HEAD STACK AND ACTUATOR ARM ASSEMBLIES INCLUDING A BOBBIN TO STIFFEN THE COIL PORTION OF AN ACTUATOR OF A HARD DISK DRIVE AND DISK DRIVES INCLUDING THE SAME

(75) Inventors: Sudha Narayanan, San Jose, CA (US); John E. Scura, Paso Robles, CA (US); Seungman Chang, San Jose, CA (US); Chen-Chi Lin, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/427,651

(22) Filed: Apr. 30, 2003

(51) Int. Cl.[7] ............................................. G11B 5/596
(52) U.S. Cl. ................................................. 360/265.8
(58) Field of Search ........................... 360/265.8, 265.7

(56) References Cited

U.S. PATENT DOCUMENTS

| | | | |
|---|---|---|---|
| 5,790,348 A * | 8/1998 | Alfred et al. ............... 360/265 |
| 5,862,019 A * | 1/1999 | Larson .................... 360/265.8 |
| 6,061,206 A * | 5/2000 | Foisy et al. .............. 360/265.7 |
| 6,252,746 B1 | 6/2001 | Cho | |
| 6,302,626 B1 * | 10/2001 | Du et al. ....................... 410/12 |
| 6,404,596 B1 * | 6/2002 | McReynolds et al. ... 360/265.8 |
| 6,512,658 B1 * | 1/2003 | Jierapipatanakul et al. ........................ 360/264.7 |
| 6,787,941 B2 * | 9/2004 | Takashima ................... 310/12 |
| 6,801,404 B1 * | 10/2004 | Oveyssi .................. 360/265.8 |
| 6,867,950 B1 * | 3/2005 | Lin ......................... 360/265.8 |

* cited by examiner

Primary Examiner—Angel Castro
(74) Attorney, Agent, or Firm—Young Law Firm

(57) ABSTRACT

A disk drive includes a disk and a head stack assembly for reading and writing to the disk. The head stack assembly includes a body portion defining a through bore that defines a pivot axis; an actuator arm cantilevered from the body portion and a head gimbal assembly coupled to the actuator arm. A coil portion is cantilevered from the body portion in an opposite direction from the actuator arm. The coil portion defines first and second actuator fork members and includes a coil supported by the first and second actuator fork members. A bobbin is configured to stiffen the coil portion, and is attached to an inner periphery of the coil. The bobbin may define a first truss and a second truss that crosses the first truss. An adhesive is disposed between the bobbin and the wound coil.

18 Claims, 8 Drawing Sheets

HEAD STACK AND ACTUATOR ARM ASSEMBLIES INCLUDING A BOBBIN TO STIFFEN THE COIL PORTION OF AN ACTUATOR OF A HARD DISK DRIVE AND DISK DRIVES INCLUDING THE SAME

BACKGROUND OF THE INVENTION

1. Field of the Invention

This invention relates to magnetic disk drives. In particular, embodiments of the present invention relate to disk drives, head stack assemblies and actuator arm assemblies that include a bobbin to stiffen the coil portion of an actuator.

2. Description of the Prior Art and Related Information

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. The slider is said to be "flying" over the disk when in this state.

FIG. 1 shows an example of a conventional actuator assembly 10. As shown therein, the conventional actuator assembly 10 includes a body portion 12 from which are cantilevered one or more actuator arms 14. Also cantilevered from the actuator body portion 12 is a coil portion that includes first and second actuator fork members 16 and 18. The actuator fork members 16 and 18 support the wound coil 22 that forms a portion of the disk drive's actuator coil portion. The wound coil 22 is also at least partially encased by a plastic overmold 20, which further supports and adds rigidity to the coil 22 and to the actuator assembly 10. As shown, the actuator assembly 10 also includes a bobbin 24, which is secured to the coil 22 by an adhesive at 27 and which further increases the rigidity of the coil 22 and that of the actuator assembly 10.

The overmold 20 is formed using a plastic injection molding process at high temperatures. As it cools, the overmold 20 may form voids within its thickness. Such voids adversely affect the resulting rigidity of the overmold and that of the overall actuator assembly. While such decreased rigidity may nevertheless fall within acceptable operational parameters for drives destined for the consumer market, such decreased rigidity may adversely affect the operation of the higher performing drives aimed at the enterprise market. Indeed, the higher data densities and higher platter rotational speeds of such drives require a very rigid (stiff) actuator assembly, in which the bending, torsional, sway and system modes are shifted to higher frequencies, as compared to lower performing drives.

As the actuator assembly 10 is not and cannot be made to be perfectly stiff, these resonant modes occur as the actuator assembly 10 vibrates in response to a given excitation frequency or frequency range. Stiffening the actuator assembly 10, all other aspects thereof remaining the same, tends to beneficially increase the frequencies at which such bending vibrations occur and tends to beneficially reduce the amplitude of such vibrations. The stiffer the actuator assembly 10 can be made, the higher the frequencies will be at which it will bend responsive to a given excitation frequency or frequency range.

Such resonant modes interfere with the drive's reading and writing activities, and typically degrade the drive's seek time performance. To address such resonant modes, a notch filter or filters tuned to the resonant mode frequencies may be used in the drive's servo to attenuate signals at these frequencies, to the detriment of available servo bandwidth. Moreover, it is easier to attenuate higher frequencies without unacceptable loss of signal amplitude, as it is to attenuate unwanted resonant mode frequencies at comparatively lower frequencies. From the foregoing, it may be appreciated that there is a clear need for shifting the resonant mode frequencies (such as the pivot butterfly frequency) higher and/or to eliminate one or more resonant modes of actuator assemblies of hard disk drives. Doing so would decrease drive seek times and decrease the degradation of servo bandwidth caused by such resonant modes, among other benefits. As the VCM is driven with ever-higher currents to reduce seek times, thermal dissipation in the VCM becomes a non-negligible issue. Indeed, heat is generated as the coil of the VCM is subjected to high coil driving currents and this heat must be dissipated. A need has developed, therefore, to find means for efficiently dissipating such heat to insure that the VCM is not damaged and may continue to be driven with such high driving currents.

SUMMARY OF THE INVENTION

An embodiment of the present invention is a disk drive, comprising a disk; a head stack assembly for reading and writing to the disk, the head stack assembly comprising: a body portion defining a through bore that defines a pivot axis; an actuator arm cantilevered from the body portion; a head gimbal assembly coupled to the actuator arm; a coil portion cantilevered from the body portion in an opposite direction from the actuator arm, the coil portion defining first and second actuator fork members and including a coil supported by the first and second actuator fork members; a bobbin configured to stiffen the coil portion, the bobbin being attached to an inner periphery of the coil and defining a first truss and a second truss, the first truss crossing the second truss, and an adhesive disposed between the bobbin and the wound coil.

The first and second trusses together may define a substantially X-shaped bobbin truss assembly or a substantially cross-shaped bobbin truss assembly, for example. The coil may be wound so as to define a first coil leg substantially parallel to the first actuator fork member, a second coil leg substantially parallel to the second actuator fork member and third and fourth coil legs between the first and second coil legs. The bobbin further may define one or more of: a first bending truss extending between the first and third coil legs; a second bending truss extending between the second and third coil legs; a third bending truss extending between the first and fourth coil legs, and a fourth bending truss extending between the second and fourth coil legs. The first and second trusses together may support the first to fourth bending trusses. The bobbin may be configured to define one or more of: a first void bounded by the first bending truss and a portion of the first coil leg and a portion of the third coil leg; a second void bounded by the second bending truss and a portion of the second coil leg and a portion of the third coil leg; a third void bounded by the third bending truss and a portion of the first coil leg and a portion of the fourth coil leg, and a fourth void bounded by the fourth bending truss and a portion of the second coil leg and a portion of the fourth coil leg.

According to another embodiment thereof, the present invention is a head stack assembly for reading and writing to a disk of a disk drive, comprising: a body portion defining a through bore that defines a pivot axis; an actuator arm cantilevered from the body portion; a head gimbal assembly coupled to the actuator arm; a coil portion cantilevered from the body portion in an opposite direction from the actuator arm, the coil portion defining first and second actuator fork members and including a coil supported by the first and second actuator fork members; a bobbin configured to stiffen the coil portion, the bobbin being attached to an inner periphery of the coil and defining a first truss and a second truss, the first truss crossing the second truss, and an adhesive disposed between the bobbin and the wound coil.

The first and second trusses together may define a substantially X-shaped bobbin truss assembly or a substantially cross-shaped bobbin truss assembly, for example. The coil may be wound so as to define a first coil leg substantially parallel to the first actuator fork member, a second coil leg substantially parallel to the second actuator fork member and third and fourth coil legs between the first and second coil legs and the bobbin further may define one or more of a first bending truss extending between the first and third coil legs; a second bending truss extending between the second and third coil legs; a third bending truss extending between the first and fourth coil legs, and a fourth bending truss extending between the second and fourth coil legs. The first and second trusses together may support the first to fourth bending trusses. The bobbin may be configured to define one or more of: a first void bounded by the first bending truss and a portion of the first coil leg and a portion of the third coil leg; a second void bounded by the second bending truss and a portion of the second coil leg and a portion of the third coil leg; a third void bounded by the third bending truss and a portion of the first coil leg and a portion of the fourth coil leg, and a fourth void bounded by the fourth bending truss and a portion of the second coil leg and a portion of the fourth coil leg.

The present invention may also be viewed, according to another embodiment thereof, as an actuator arm assembly for a disk drive, comprising: a body portion defining a through bore that defines a pivot axis; an actuator arm cantilevered from the body portion; a coil portion cantilevered from the body portion in an opposite direction from the actuator arm, the coil portion defining first and second actuator fork members and including a coil supported by the first and second actuator fork members; a bobbin configured to stiffen the coil portion, the bobbin being attached to an inner periphery of the coil and defining a first truss and a second truss, the first truss crossing the second truss, and an adhesive disposed between the bobbin and the wound coil.

The first and second trusses together may define a substantially X-shaped bobbin truss assembly or a substantially cross-shaped bobbin truss assembly, for example. The coil may be wound so as to define a first coil leg substantially parallel to the first actuator fork member, a second coil leg substantially parallel to the second actuator fork member and third and fourth coil legs between the first and second coil legs. The bobbin further may define one or more of: a first bending truss extending between the first and third coil legs; a second bending truss extending between the second and third coil legs; a third bending truss extending between the first and fourth coil legs, and a fourth bending truss extending between the second and fourth coil legs.

The first and second trusses together may support the first to fourth bending trusses. The bobbin may be configured to define one or more of: a first void bounded by the first bending truss and a portion of the first coil leg and a portion of the third coil leg; a second void bounded by the second bending truss and a portion of the second coil leg and a portion of the third coil leg; a third void bounded by the third bending truss and a portion of the first coil leg and a portion of the fourth coil leg, and a fourth void bounded by the fourth bending truss and a portion of the second coil leg and a portion of the fourth coil leg.

The present invention may also be viewed as an actuator arm assembly for a disk drive, comprising: a body portion defining a through bore that defines a pivot axis; an actuator arm cantilevered from the body portion; a coil portion cantilevered from the body portion in an opposite direction from the actuator arm, the coil portion defining first and second actuator fork members and including a coil supported by the first and second actuator fork members; a bobbin configured to stiffen the coil portion, the bobbin being attached to an inner periphery of the coil and being configured to define a first to fourth voids between the inner periphery of the coil and an outer periphery of the bobbin and defining a stiffening truss for stiffening the bobbin, and an adhesive disposed between the bobbin and the wound coil.

The coil may be wound so as to define a first coil leg substantially parallel to the first actuator fork member, a second coil leg substantially parallel to the second actuator fork member and third and fourth coil legs between the first and second coil legs and the bobbin further may define one or more of: a first bending truss extending between the first and third coil legs; a second bending truss extending between the second and third coil legs; a third bending truss extending between the first and fourth coil legs, and a fourth bending truss extending between the second and fourth coil legs.

The stiffening truss may be coupled between one of the first to fourth bending trusses to another one of the first to fourth bending trusses. The first void may be defined and bounded by the first bending truss and a portion of the first coil leg and a portion of the third coil leg; the second void may be defined and bounded by the second bending truss and a portion of the second coil leg and a portion of the third coil leg; the third void may be defined and bounded by the third bending truss and a portion of the first coil leg and a portion of the fourth coil leg, and the fourth void may be defined and bounded by the fourth bending truss and a portion of the second coil leg and a portion of the fourth coil leg.

DESCRIPTION OF PREFERRED EMBODIMENTS

Figure 11:
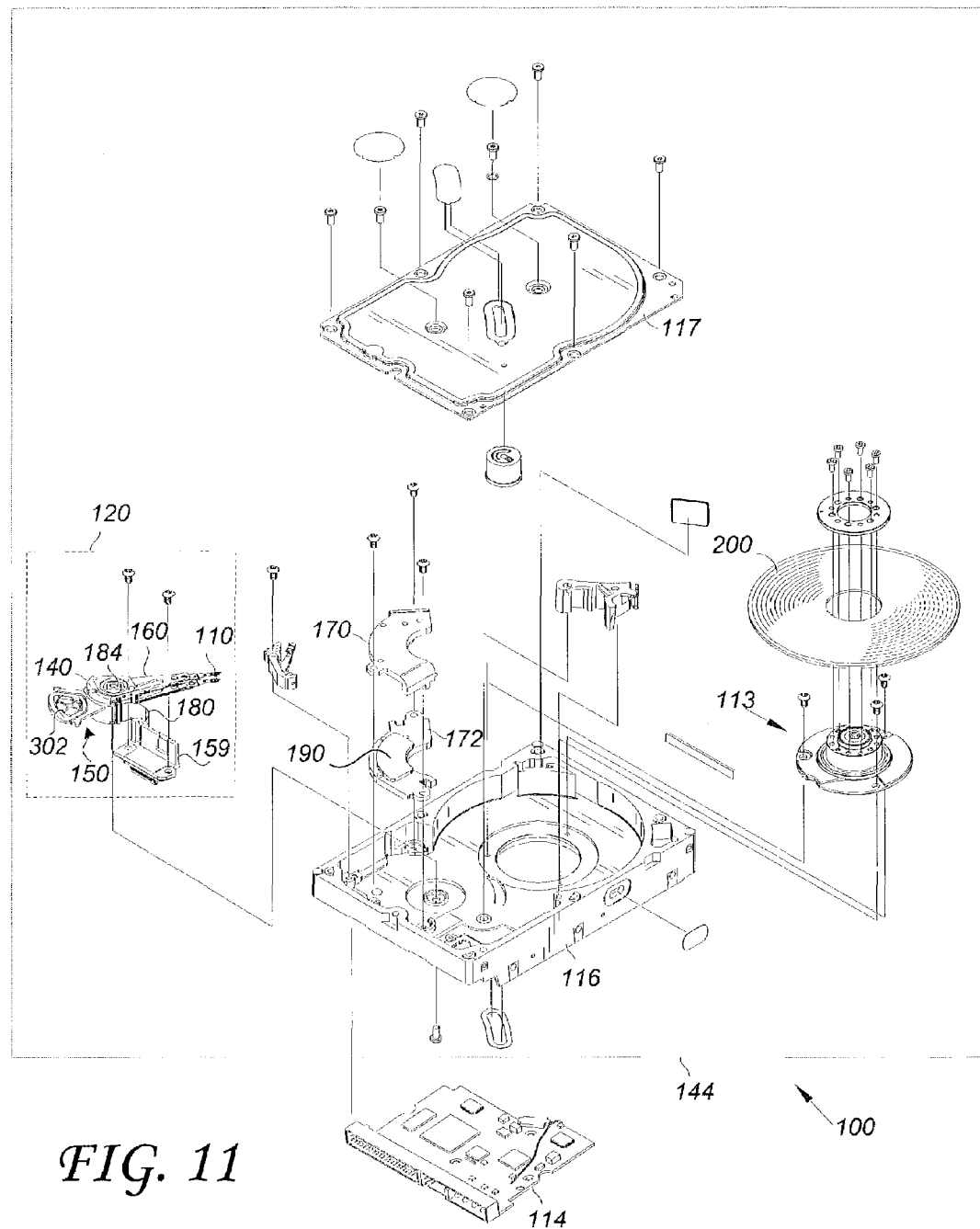
FIG. 11 is an exploded view of a disk drive incorporating a head stack assembly according to an embodiment of the present invention.

FIG. 11 shows the principal components of a magnetic disk drive 100 constructed in accordance with the present invention. With reference to FIG. 11, the disk drive 100 comprises a head disk assembly (HDA) 144 and a printed circuit board assembly (PCBA) 114. The HDA 144 includes a base 116 and a cover 117 attached to the base 116 that collectively house a disk 200, a spindle motor 113 attached to the base 116 for rotating the disk 200, a head stack assembly (HSA) 120, and a pivot bearing cartridge 184 that rotatably supports the HSA 120 on the base 116. The spindle motor 113 rotates the disk 200 at a constant angular velocity. The HSA 120 comprises a swing-type or rotary actuator assembly 130 (see FIG. 2), at least one head gimbal assembly (HGA) 110, a flex circuit cable assembly 180 and a flex bracket 159. The rotary actuator assembly 130 includes a body portion 140, at least one actuator arm 160 cantilevered from the body portion 140, and a coil portion 150 cantilevered from the body portion 140 in an opposite direction from the actuator arm 160 and supported by first and second actuator fork members, best shown in FIG. 3 at 304 and 306. A bobbin 302 may be attached to the inner periphery of the coil of the coil portion 150 to stiffen the coil portion 150. The bobbin 302 may define a first truss and a second truss in which the first truss crosses the second truss, as described in detail below. Alternatively, the bobbin 302 may be configured to define first to fourth voids between the inner periphery of the coil and an outer periphery of the bobbin and one or more stiffening trusses for stiffening the bobbin, as also described in detail below. The actuator arm(s) 160 support the HGA(s) 110 that, in turn, support slider(s) (not shown) for reading and writing to the disk 200. The HSA 120 is pivotally secured to the base 116 via the pivot-bearing cartridge 184 so that the slider at the distal end of the HGA 110 may be moved over the surfaces of the disk 200. The pivot-bearing cartridge 184 enables the HSA 120 to pivot about a pivot axis, shown in FIG. 2 at reference numeral 182.

The storage capacity of the HDA 144 may be increased by, for example, increasing the track density on the disk 200 and/or by including additional disks in the drive and by an HSA 120 having a vertical stack of HGAs 110 supported by multiple actuator arms 160. The "rotary" or "swing-type" actuator assembly rotates on the pivot bearing 184 cartridge between limited positions, and the coil portion 150 that extends from one side of the body portion 140 interacts with one or more permanent magnets 192 mounted to back irons 170, 172 to form a voice coil motor (VCM). The VCM causes the HSA 120 to pivot about the actuator pivot axis 182 and causes the slider and the read write transducers thereof to sweep radially over the disk 200.

Figure 1:
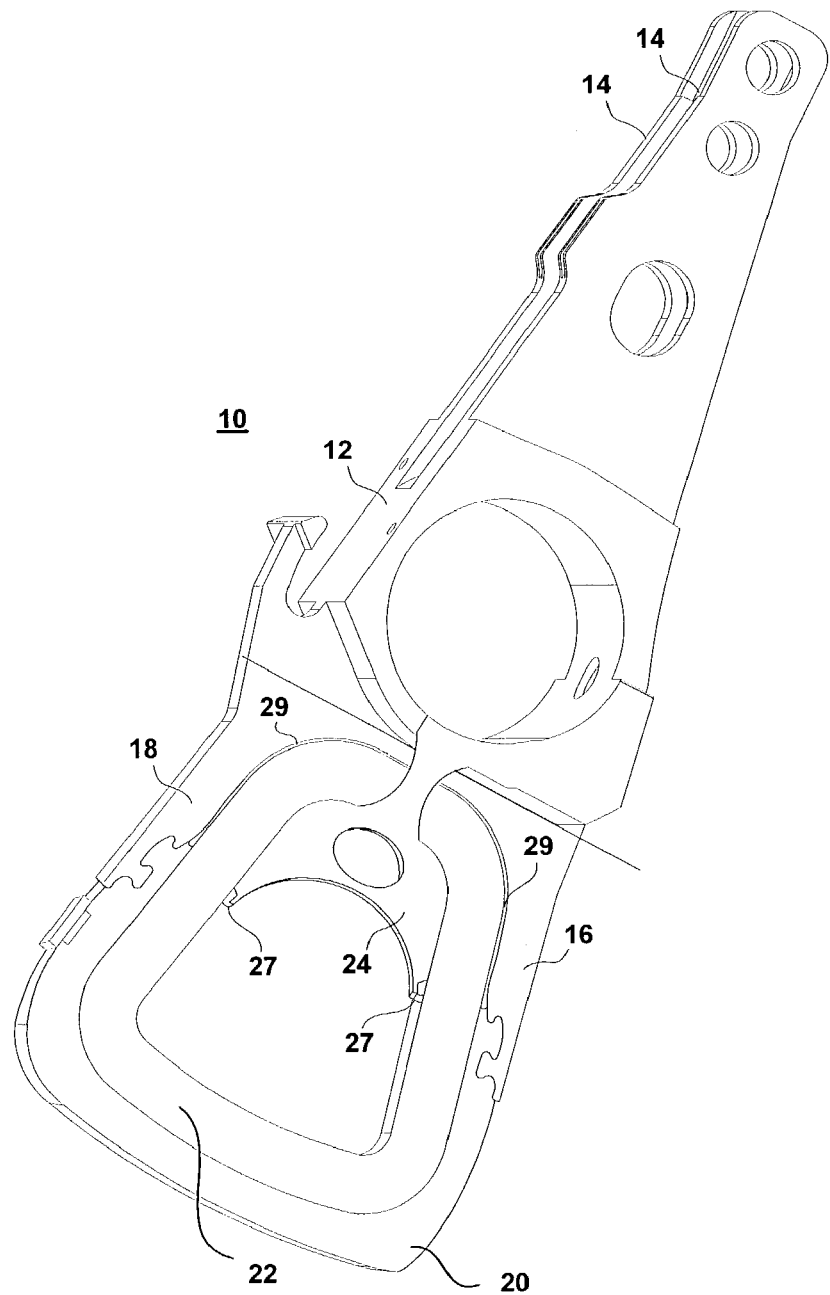
FIG. 1 shows a conventional actuator assembly.
Figure 2:
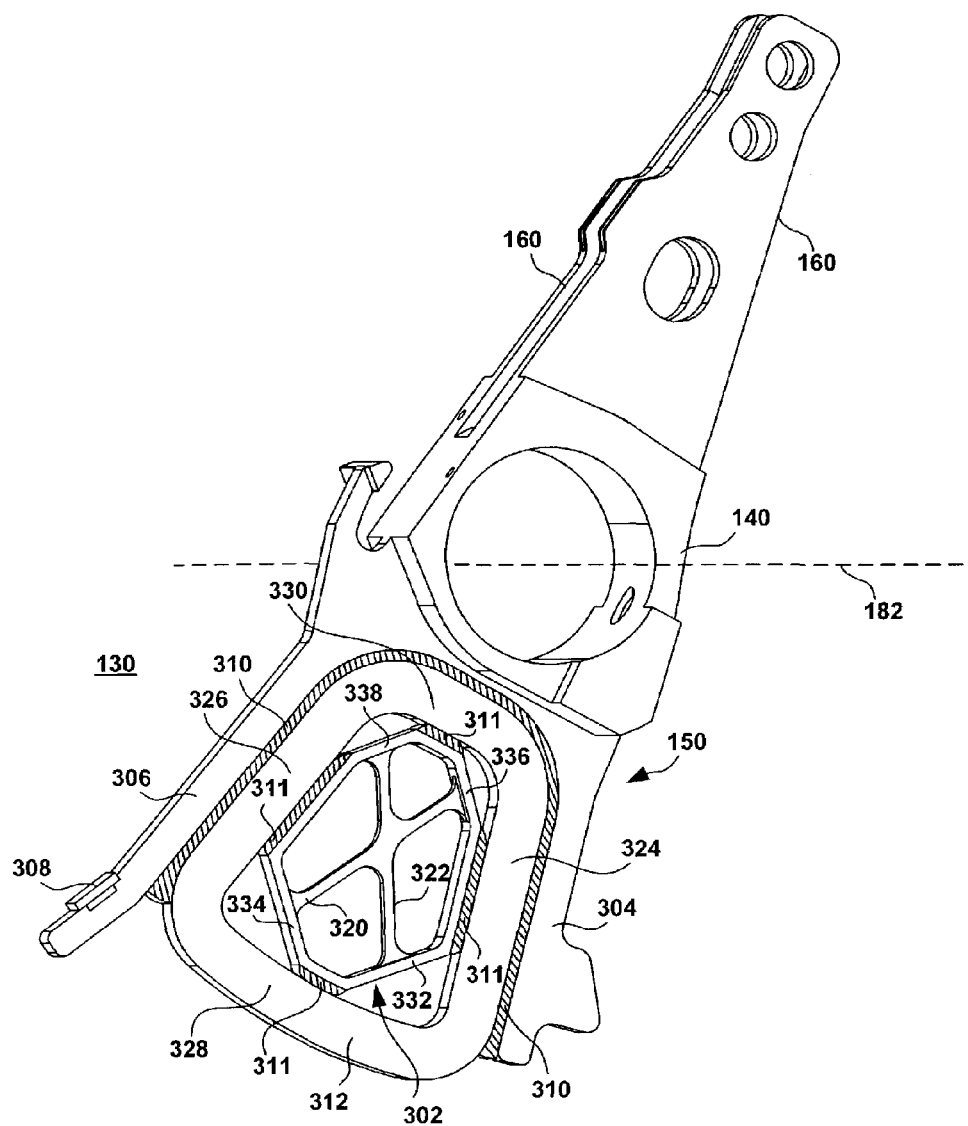
FIG. 2 is a perspective view of a bobbin according to an embodiment of the present invention.

FIG. 2 shows an actuator assembly 130 according to an embodiment of the present invention. As shown therein, the actuator assembly 130 includes a body portion 140 from which one or more actuator arms 160 are cantilevered. Cantilevered from the body portion 140 in the opposite direction from the actuator arms 160 is a coil portion 150 that includes a first actuator fork member 304 and a second actuator fork member 306 that together support a coil 312. The coil 312 may be attached to the first and second actuator fork members 304, 306 by means of, for example, a layer of adhesive material 310. One of the first and second actuator fork members 304, 306 may include a tang 308 of a magnetic latch assembly.

To stiffen the wound coil 312, a bobbin 302 may be secured to or within the windings of the coil 312. For example, the bobbin 302 may be attached to the inner periphery of the coil 312. The bobbin 302 may have any shape that is effective in increasing the rigidity of the coil portion 150 and/or the actuator assembly 130. The bobbin 302 may define one or more voids between the inner periphery of the coil 312 and the bobbin 302 and one or more stiffening trusses. In the exemplary embodiment shown in FIG. 2, the bobbin 302 defines a first truss 320 and a second truss 322 that together define a substantially X-shaped bobbin truss assembly. Other shapes for the bobbin 302 may be devised. The bobbin 302 may include or be formed of, for example, PPS (polyphenylene sulphide) that may be reinforced with, for example, glass or carbon fiber and that may include thermally conductive filler. The bobbin 302 may be attached to the wound coil 312 by means of, for example, one or more layers of adhesive 311 disposed between the bobbin 302 and the wound coil 312. The adhesive layer(s) 311 may be thermally conductive, to support the heat dissipation functionality of the bobbin 302. For example, the adhesive layer(s) may include thermally conductive filled epoxy. The adhesive layer(s) 310 may have the same composition as the adhesive layer(s) 311.

Figure 3:
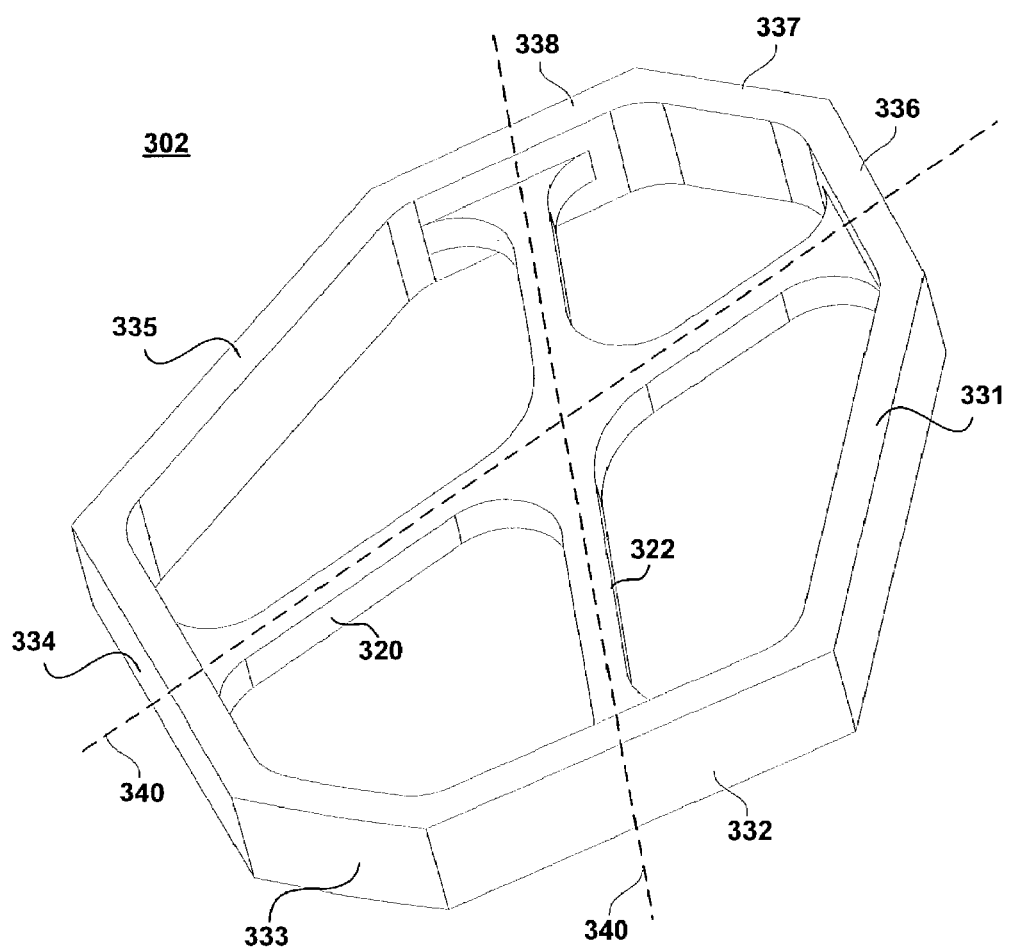
FIG. 3 shows a perspective view of an actuator assembly including a bobbin, according to an embodiment of the present invention.

FIG. 3 shows the exemplary bobbin 302 of FIG. 2, according to an embodiment of the present invention. Considering now FIGS. 2 and 3 collectively, the coil 312 may be wound and configured so as to define a first coil leg 324 substantially parallel to the first actuator fork member 304 and a second coil leg 326 substantially parallel to the second actuator fork member 306. Similarly, a third coil leg 328 and a fourth coil leg 330 may be defined between the first and second coil legs 324, 326. Keeping with the above nomenclature, the bobbin 302, according to an embodiment of the present invention, may define a first bending truss 332 extending between the first coil leg 324 and the third coil leg 328; a second bending truss 334 extending between the second coil leg 326 and the third coil leg 328; a third bending truss 336 extending between the first coil leg 324 and the fourth coil leg 330, and a fourth bending truss 338 extending between the second coil leg 326 and the fourth coil leg 330.

As best shown in FIG. 3, according to an embodiment of the present invention, the first truss 320 and the second truss 322 may cross each other. For example, the first and second trusses 320, 322 may together define a substantially cross- or X-shaped bobbin truss assembly. The X-shape is suggested by the crossed phantom lines 340 in FIG. 3. According to the embodiment of the present invention shown in FIGS. 2 and 3, the first and second trusses 320, 322 together support the first to fourth bending trusses 332, 334, 336 and 338.

A bobbin according to an embodiment of the present invention preferably has a high stiffness to mass ratio. Indeed, the stiffness of the bobbin may be traded against the mass thereof, to achieve an actuator arm and head stack assembly having an acceptably high stiffness and acceptably low inertia. A high stiffness is desirable to increase the pivot butterfly frequency and a low inertia is desirable to achieve fast seek times.

Figure 4:
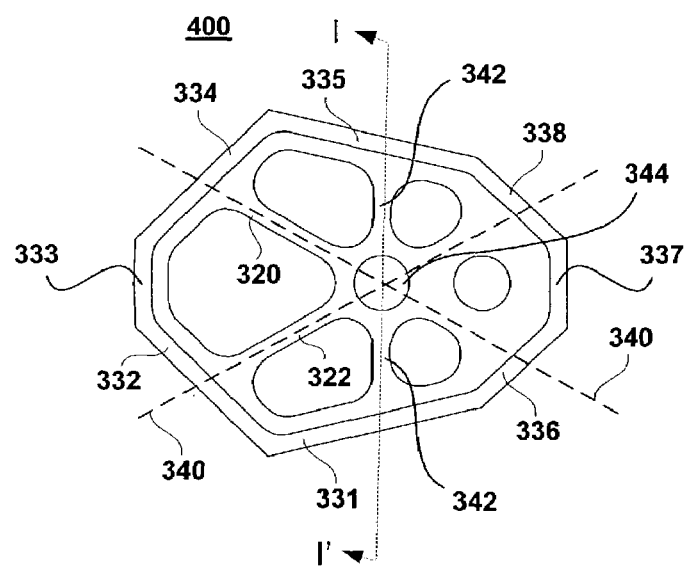
FIG. 4 is a top view of a bobbin according to another embodiment of the present invention.

FIG. 4 is a top view of a bobbin 400 according to another embodiment of the present invention. As shown in FIGS. 2, 3 and 4, the bobbins 302 and 400 may advantageously be designed with bending trusses 332, 334, 336 and 338 as well as the crossing (e.g., cross- or X-shaped, for example) first and second trusses 320, 322. As the coil 312 flexes at a resonant frequency (and/or other frequencies), the bending trusses 332, 334, 336 and 338 may function to tether the ends of the coil 312 and to provide additional stiffness to the assembly. During such flexing at the resonant frequency (and/or other frequencies), the bending trusses 332, 334, 336 and 338 may be subjected to bending forces—that is, to forces that tend to bend the bending trusses 332, 334, 336 and 338. The exemplary stiffening trusses 320, 322 may provide additional stiffness to the coil portion 150 and may support the bending trusses 332, 334, 336 and 338 and may prevent or reduce the degree of bucking thereof at resonance. As also shown in FIG. 3, the bobbin may include a bending truss 331 that is substantially parallel to the first coil leg 324, a bending truss 335 that is substantially parallel to the second coil leg 326, a bending truss 333 that is substantially parallel to the third coil leg 328 and another bending truss 337 that is substantially parallel to the fourth coil leg 330.

Figure 5:
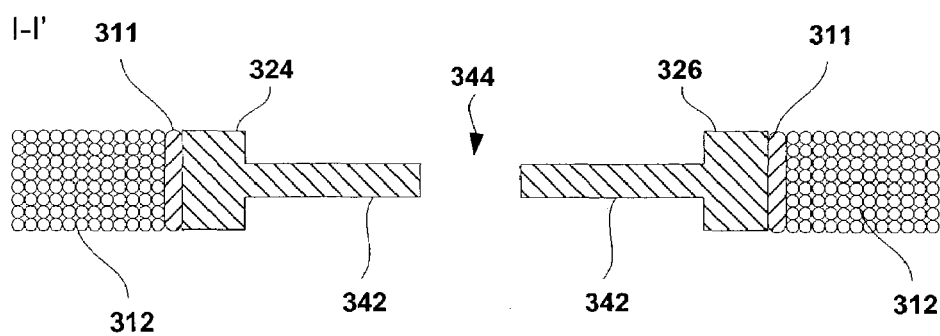
FIG. 5 is a cross-sectional view of the bobbin of FIG. 4, shown with a cross-sectional view of the coil of the VCM portion, according to an embodiment of the present invention.
Figure 6:
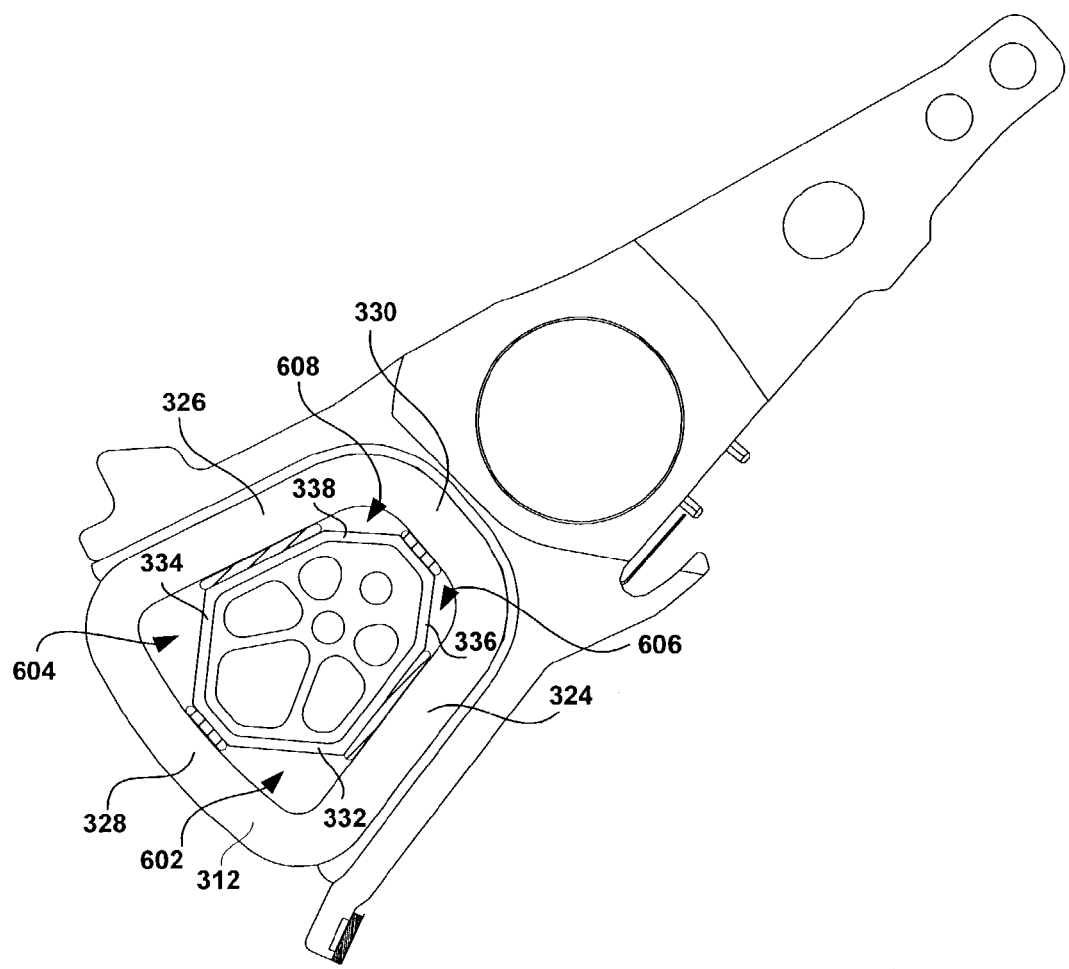
FIG. 6 shows a plan view of an actuator assembly including the bobbin of FIG. 4, according to an embodiment of the present invention.

FIG. 5 is a cross-sectional view of the bobbin 400 of FIG. 4, shown (not to scale) together with a cross-sectional view of the coil 312 of the VCM portion, for illustrative purposes. FIG. 6 shows a plan view of an actuator assembly including the bobbin of FIG. 4, according to an embodiment of the present invention. As shown in FIGS. 4 and 6, to provide increased stiffness, a portion of the voids defined by the crossing trusses 320, 322 and the bending trusses 332, 334, 336 and 338 may be filled in. The bobbin 400 may define a plurality of voids, a plurality of filled-in areas and a plurality of trusses that support and reduce the buckling of the bending trusses 332, 334, 336 and 338. In the embodiment illustrated in FIG. 4, an additional truss 342 is defined between the bending trusses 331 and 3335 and an additional void is defined within the bobbin, as shown at 344 in FIGS. 4 and 5. It is to be noted that the precise configuration, emplacement and number of the bending trusses relative to the support and stiffening trusses, and/or voids within a bobbin according to the present invention is a design choice that may driven, at least in part, by the resultant mass of the bobbin (and thus its inertia), the bobbin's ability to stiffen the coil portion 150 and the thermal properties thereof.

FIGS. 7–10 are partial plan views of actuator assemblies including a bobbin according to further embodiments of the present invention. As shown, the coil 312 is supported by the first and second actuator fork members 304, 306. The actuator assemblies shown therein each include a bobbin that stiffens the coil portion and that is attached to the inner periphery of the coil 312. The exemplary bobbins of FIGS. 7–10 may be configured to define a first to fourth void between the inner periphery of the coil 312 and the outer periphery of the bobbin and may define one or more stiffening trusses for stiffening the bobbin.

Figure 7:
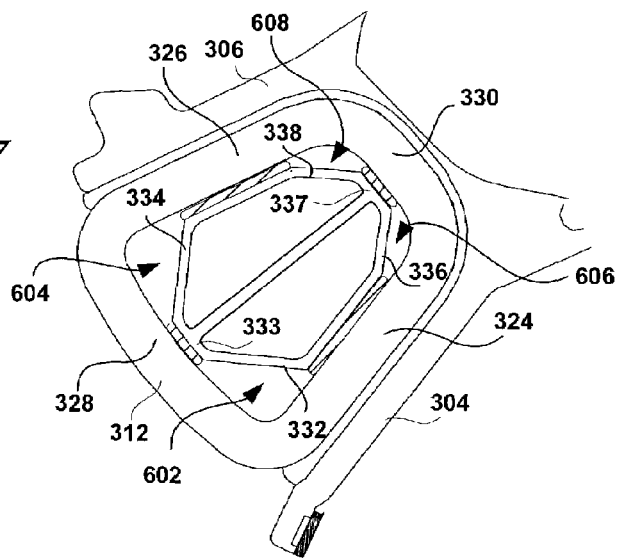
FIG. 7 is a partial plan view of an actuator assembly including a bobbin according to an embodiment of the present invention.

Indeed, with particular reference to FIG. 7, the coil 312 may be wound so as to define a first coil leg 324 substantially parallel to the first actuator fork member 304, a second coil leg 326 substantially parallel to the second actuator fork member 306 and third and fourth coil legs 328, 330 between the first and second coil legs 324, 326. According to embodiments of the present invention, the bobbin may further define one or more of the following bending trusses: a first bending truss 332 extending between the first and third coil legs 324, 328; a second bending truss 334 extending between the second and third coil legs 326, 328; a third bending truss 336 extending between the first and fourth coil legs 324, 330 and/or a fourth bending truss 338 extending between the second and fourth coil legs 326, 330.

As noted above, these bending trusses may be configured to define a first void 602 bounded by the first bending truss 332 and a portion of the first coil leg 324 and a portion of the third coil leg 328; a second void 604 bounded by the second bending truss 334 and a portion of the second coil leg 326 and a portion of the third coil leg 328; a third void 606 bounded by the third bending truss 336 and a portion of the first coil leg 324 and a portion of the fourth coil leg 330, and/or a fourth void 608 bounded by the fourth bending truss 338 and a portion of the second coil leg 326 and a portion of the fourth coil leg 330. The bending trusses need not be straight as shown in the figures, but may have an arcuate shape, for example. Alternately, the voids may be defined and bounded by other combinations of coil legs and bending trusses.

Figure 8:
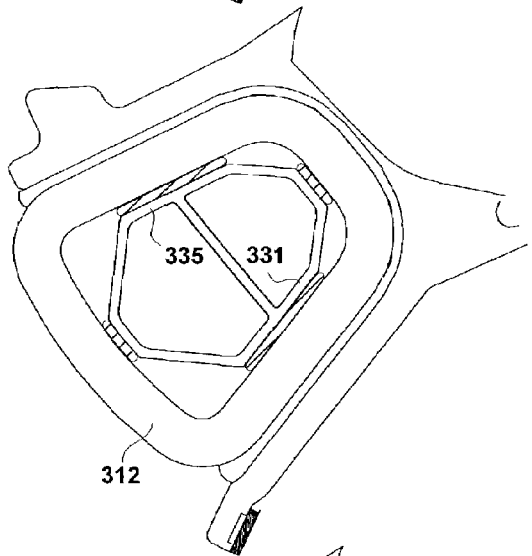
FIG. 8 is a partial plan view of an actuator assembly including a bobbin according to another embodiment of the present invention.
Figure 9:
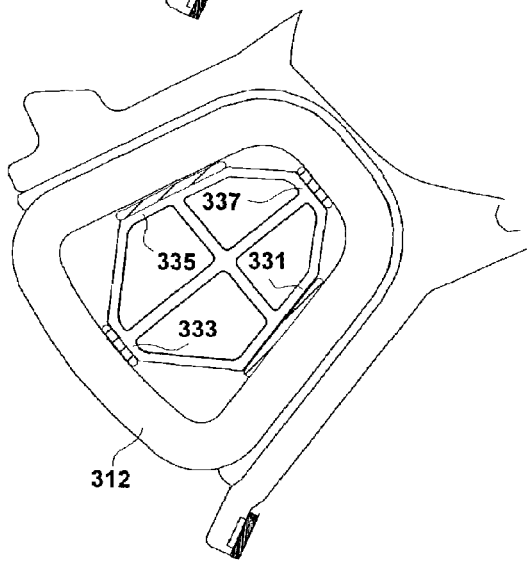
FIG. 9 is a partial plan view of an actuator assembly including a bobbin according to still another embodiment of the present invention.
Figure 10:
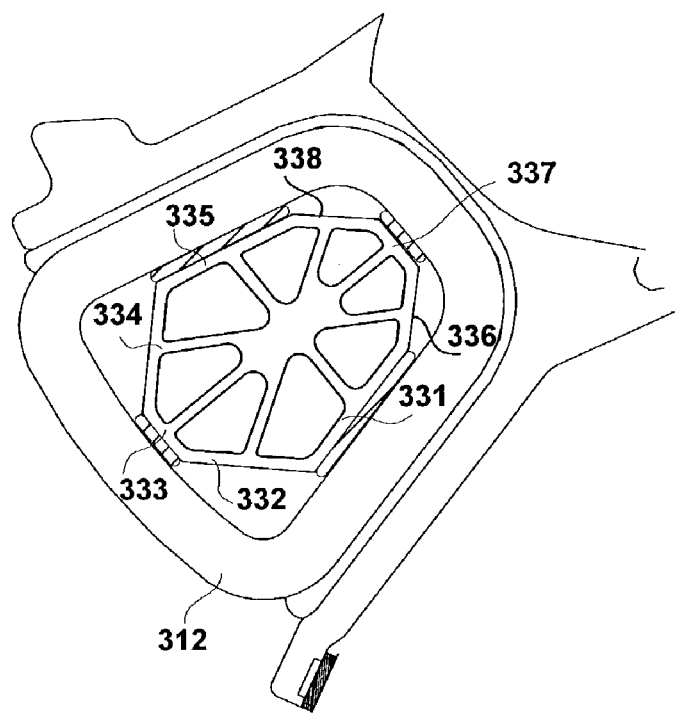
FIG. 10 is a partial plan view of an actuator assembly including a bobbin according to yet another embodiment of the present invention.

One or more stiffening trusses may be coupled between one bending trusses 331, 332, 333, 334, 335, 336, 337 and 338 and another one of the bending trusses 331, 332, 333, 334, 335, 336, 337 and 338. FIG. 7 shows an embodiment in which a stiffening truss is defined between the bending trusses 337 and 333. FIG. 8 shows and embodiment in which a stiffening truss is defined between the bending trusses 331 and 335. FIG. 9 shows another embodiment in which a first stiffening truss is defined between the bending trusses 331 and 335 and in which a second stiffening truss is defined between the bending trusses 333 and 337. The first and second trusses, therefore, cross each other. FIG. 10 shows yet another exemplary embodiment of the present invention, in which a stiffening truss spans between each of the following pairs of bending trusses: 333 and 337; 331 and 335; 332 and 338, and between bending trusses 334 and 336. As is apparent, a great many combinations of bending and stiffening trusses are possible. Also, the structure, shape, number and emplacement of the bending trusses may be varied at will in keeping with the mass of the bobbin (and thus its inertia), the bobbin's ability to stiffen the coil 312 and the thermal properties thereof.

As noted above, the bobbins according to embodiments of the present invention preferably also function to dissipate heat from the coil 312 when high currents are applied therethrough. Toward that end, the bobbin may be made of or include thermally conductive plastic and/or metal. In addition, the bobbin may be attached to the coil 312 with a thermally conductive adhesive (as shown at 311) to aid in heat conduction away from the coil 312. In that case, some of the heat generated in the coil 312 may be transmitted across the interfaces between the adhesive 311 and the bobbin 300, 400 and transmitted across the interfaces between the adhesive 310 and the first and second actuator fork members 304, 306. For example, the bending trusses 331, 333, 335 and 337 may be formed locally thicker than the other bending trusses, in order to achieve better thermal dissipation characteristics. Moreover, the bobbin may be configured to maximize the exposed surfaces thereof to aid in heat convection, within the intended stiffness and inertia design parameters of the bobbin. Accordingly, the exposed surfaces of the bobbin may define various elevational features designed to increase the effective exposed surface area of the bobbin, thereby rendering the bobbin a better heat radiator.

The bobbins 300, 400 may also include cleating features to further strengthen the bond at the interface between the bobbins 300, 400 and the coil 312, as described in commonly assigned and co-pending U.S. patent application Ser. No. 10,xxx,xxx filed on xx/xx/2003 entitled "Cleating Features To Improve Adhesive Interface Between A Bobbin And A Coil Of An Actuator Coil Portion Of A Hard Disk Drive", the disclosure of which is incorporated herein in its entirety.

Advantageously, the embodiments of the bobbins described herein stiffen the coil portion 150 and correspondingly stiffen the actuator assembly 130 and improve its thermal conductance characteristics. This enables the resonant mode frequencies of the actuator assembly to be shifted to higher frequencies and may enable the elimination or an attenuation of the detrimental effects of one or more of the resonant modes of the actuator assembly. Those of skill in the art may recognize that modifications of the embodiments disclosed herein are possible. For example, although the actuator assembly 130 of FIG. 2 is shown without an overmold around the free end of the wound coil 312, embodiments of the present invention may be combined with a plastic overmold to lend further rigidity to the coil portion 150 of the actuator assembly 130. Other modifications may occur to those of skill in this art, and all such modifications are deemed to fall within the purview of the present invention, as defined by the claims.

What is claimed is:

1. A disk drive, comprising:
    a disk;
    a head stack assembly for reading and writing to the disk, the head stack assembly comprising:
    a body portion defining a through bore that defines a pivot axis;
    an actuator arm cantilevered from the body portion;
    a head gimbal assembly coupled to the actuator arm;
    a coil portion cantilevered from the body portion in an opposite direction from the actuator arm, the coil portion defining first and second actuator fork members and including a coil supported by the first and second actuator fork members;
    a bobbin configured to stiffen the coil portion, the bobbin being attached to an inner periphery of the coil and defining a first truss and a second truss, the first truss crossing the second truss, and
    an adhesive disposed between the bobbin and the wound coil.

2. The disk drive of claim 1, wherein the first and second trusses together define a substantially X-shaped bobbin truss assembly.

3. The disk drive of claim 1, wherein the first and second trusses together define a substantially cross-shaped bobbin truss assembly.

4. The disk drive of claim 1, wherein the coil is wound so as to define a first coil leg substantially parallel to the first actuator fork member, a second coil leg substantially parallel to the second actuator fork member and third and fourth coil legs between the first and second coil legs and wherein the bobbin further defines at least one of:
    a first bending truss extending between the first and third coil legs;
    a second bending truss extending between the second and third coil legs;
    a third bending truss extending between the first and fourth coil legs, and
    a fourth bending truss extending between the second and fourth coil legs.

5. The disk drive of claim 4, wherein the first and second trusses together support the first to fourth bending trusses.

6. The disk drive of claim 4, wherein the bobbin is configured to define at least one of:
    a first void bounded by the first bending truss and a portion of the first coil leg and a portion of the third coil leg,
    a second void bounded by the second bending truss and a portion of the second coil leg and a portion of the third coil leg;
    a third void bounded by the third bending truss and a portion of the first coil leg and a portion of the fourth coil leg, and
    a fourth void bounded by the fourth bending truss and a portion of the second coil leg and a portion of the fourth coil leg.

7. A head stack assembly for reading and writing to a disk of a disk drive, comprising:
    a body portion defining a through bore that defines a pivot axis;
    an actuator arm cantilevered from the body portion;
    a head gimbal assembly coupled to the actuator arm;
    a coil portion cantilevered from the body portion in an opposite direction from the actuator arm, the coil portion defining first and second actuator fork members and including a coil supported by the first and second actuator fork members;
    a bobbin configured to stiffen the coil portion, the bobbin being attached to an inner periphery of the coil and defining a first truss and a second truss, the first truss crossing the second truss, and
    an adhesive disposed between the bobbin and the wound coil.

8. The head stack assembly of claim 7, wherein the first and second trusses together define a substantially X-shaped bobbin truss assembly.

9. The head stack assembly of claim 7, wherein the first and second trusses together define a substantially cross-shaped bobbin truss assembly.

10. The bead stack assembly of claim 7, wherein the coil is wound so as to define a first coil leg substantially parallel to the first actuator fork member, a second coil leg substantially parallel to the second actuator fork member and third and fourth coil legs between the first and second coil legs and wherein the bobbin further defines at least one of:
    a first bending truss extending between the first and third coil legs;
    a second bending truss extending between the second and third coil legs;
    a bending truss extending between the first and fourth coil legs, and
    a fourth bending truss extending between the second and fourth coil legs.

11. The head stack assembly of claim 10, wherein the first and second trusses together support the first to fourth bending trusses.

12. The head stack assembly of claim 10, wherein the bobbin is configured to define at least one of
   a first void bounded by the first bending truss and a portion of the first coil leg and a portion of the third coil leg;
   a second void bounded by the second bending truss and a portion of the second coil leg and a portion of the third coil leg;
   a third void bounded by the third bending truss and a portion of the first coil leg and a portion of the fourth coil leg, and
   a fourth void bounded by the fourth bending truss and a portion of the second coil leg and a portion of the fourth coil leg.

13. An actuator arm assembly for a disk drive, comprising
   a body portion defining a through bore that defines a pivot axis;
   an actuator arm cantilevered from the body portion;
   a coil portion cantilevered from the body portion in an opposite direction from the actuator arm, the coil portion defining first and second actuator fork members and including a coil supported by the first and second actuator fork members;
   a bobbin configured to stiffen the coil portion, the bobbin being attached to an inner periphery of the coil and defining a first truss and a second truss, the first truss crossing the second truss, and
   an adhesive disposed between the bobbin and the wound coil.

14. The actuator arm assembly of claim 13, wherein the first and second trusses together define a substantially X-shaped bobbin truss assembly.

15. The actuator arm assembly of claim 13, wherein the first and second trusses together define a substantially cross-shaped bobbin truss assembly.

16. The actuator arm assembly of claim 13, wherein the coil is wound so as to define a first coil leg substantially parallel to the first actuator fork member, a second coil leg substantially parallel to the second actuator fork member and third and fourth coil legs between the first and second coil legs and wherein the bobbin further defines at least one of:
   a first bending truss extending between the first and third coil legs;
   a second bending truss extending between the second and third coil legs;
   a third bending truss extending between the first and fourth coil legs, and
   a fourth bending truss extending between the second and fourth coil legs.

17. The actuator arm assembly of claim 16, wherein the first and second trusses together support the first to fourth bending trusses.

18. The actuator arm assembly of claim 16, wherein the bobbin is configured to define at least one of:
   a first void bounded by the first bending truss and a portion of the first coil leg and a portion of the third coil leg;
   a second void bounded by the second bending truss and a portion of the second coil leg and a portion of the third coil leg;
   a third void bounded by the third bending truss and a portion of the first coil leg and a portion of the fourth coil leg, and
   a fourth void bounded by the fourth bending truss and a portion of the second coil leg and a portion of the fourth coil leg.

* * * * *